United States Patent
Anzawa

(10) Patent No.: US 11,047,327 B2
(45) Date of Patent: *Jun. 29, 2021

(54) MISFIRE DETECTION DEVICE FOR INTERNAL COMBUSTION ENGINE, MISFIRE DETECTION SYSTEM FOR INTERNAL COMBUSTION ENGINE, DATA ANALYZER, CONTROLLER FOR INTERNAL COMBUSTION ENGINE, METHOD FOR DETECTING MISFIRE OF INTERNAL COMBUSTION ENGINE, AND RECEPTION EXECUTION DEVICE

(71) Applicant: TOYOTA JIDOSHA KABUSHIKI KAISHA, Toyota (JP)

(72) Inventor: Takumi Anzawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/820,815

(22) Filed: Mar. 17, 2020

(65) Prior Publication Data

US 2020/0309055 A1   Oct. 1, 2020

(30) Foreign Application Priority Data

Mar. 29, 2019  (JP) .............................. JP2019-065883

(51) Int. Cl.
| | | |
|---|---|---|
| *F02D 41/14* | (2006.01) | |
| *F02D 41/00* | (2006.01) | |
| *F02D 41/24* | (2006.01) | |

(52) U.S. Cl.
CPC ....... *F02D 41/1498* (2013.01); *F02D 41/009* (2013.01); *F02D 41/2409* (2013.01)

(58) Field of Classification Search
CPC ..... F02D 2041/1432; F02D 2200/1012; F02D 2200/1015; F02D 41/009; F02D 41/1498; F02D 41/2409; F02D 41/30; Y02T 10/40
See application file for complete search history.

(56) References Cited

U.S. PATENT DOCUMENTS

| | | |
|---|---|---|
| 5,093,792 A | 3/1992 | Taki et al. |
| 5,263,364 A | 11/1993 | Nakayama et al. |
| (Continued) | | |

FOREIGN PATENT DOCUMENTS

| | | |
|---|---|---|
| DE | 103 45 187 | 7/2015 |
| DE | 102013208853 | 5/2018 |
| (Continued) | | |

OTHER PUBLICATIONS

Notice of Allowance issued in corresponding U.S. Appl. No. 16/820,799, dated Dec. 3, 2020 (10 pages).
Notice of Allowance issued in corresponding U.S. Appl. No. 16/820,799 dated Feb. 22, 2021 (8 pages).

*Primary Examiner* — Carl C Staubach
(74) *Attorney, Agent, or Firm* — Oblon, McClelland, Maier & Neustadt, L.L.P.

(57) ABSTRACT

A misfire detection device for an internal combustion engine includes a storage device and processing circuitry. The storage device stores mapping data. The mapping data is data specifying a mapping that outputs a misfire variable using a rotation waveform variable as an input. The misfire variable is a variable related to a probability that a misfire has occurred in the internal combustion engine. The rotation waveform variable is a variable based on an instantaneous speed variable corresponding to each of discontinuous rotational angle intervals selected from multiple continuous rotational angle intervals.

9 Claims, 7 Drawing Sheets

(56) References Cited

U.S. PATENT DOCUMENTS

| | | | |
|---|---|---|---|
| 5,495,415 A | 2/1996 | Ribbens et al. | |
| 5,728,941 A | 3/1998 | Yamamoto et al. | |
| 5,951,617 A | 9/1999 | Shinohara et al. | |
| 6,199,057 B1 | 3/2001 | Tawel | |
| 6,434,541 B1 | 8/2002 | Tawel et al. | |
| 8,261,603 B2 | 9/2012 | Kondo et al. | |
| 8,855,888 B2* | 10/2014 | Suzuki | F02D 29/00 701/99 |
| 9,476,335 B2 | 10/2016 | Teraya et al. | |
| 2004/0122585 A1 | 6/2004 | Aono et al. | |
| 2007/0186903 A1 | 8/2007 | Zhu et al. | |
| 2010/0050753 A1 | 3/2010 | Suzuki | |
| 2010/0294027 A1 | 11/2010 | Kondo et al. | |
| 2013/0312504 A1 | 11/2013 | Bowman et al. | |
| 2014/0261317 A1 | 9/2014 | Loucks et al. | |
| 2016/0152231 A1 | 6/2016 | Sugimoto | |
| 2018/0275017 A1 | 9/2018 | Katayama | |
| 2020/0263617 A1* | 8/2020 | Hashimoto | F02D 41/22 |
| 2020/0263624 A1* | 8/2020 | Muto | F02D 41/0097 |
| 2020/0264074 A1* | 8/2020 | Hashimoto | F02D 41/1498 |
| 2020/0309053 A1* | 10/2020 | Anzawa | F02D 13/0223 |
| 2020/0309054 A1* | 10/2020 | Anzawa | F02B 63/04 |

FOREIGN PATENT DOCUMENTS

| | | |
|---|---|---|
| DE | 102015221447 | 1/2019 |
| JP | 01-301946 A | 12/1989 |
| JP | 04-091346 A | 3/1992 |
| JP | 04-259669 A | 9/1992 |
| JP | 05-195858 A | 8/1993 |
| JP | 09-042041 A | 2/1997 |
| JP | 09-166042 A | 6/1997 |
| JP | 10-110649 A | 4/1998 |
| JP | H10-252536 | 9/1998 |
| JP | A 2001-065402 | 3/2001 |
| JP | 2001-507772 A | 6/2001 |
| JP | 2002-004936 | 1/2002 |
| JP | 2009-174397 A | 8/2009 |
| JP | 2010-053730 A | 3/2010 |
| JP | 2010-264854 | 11/2010 |
| JP | 2017-110595 | 6/2017 |
| JP | 2017-155712 A | 9/2017 |
| JP | 2018-135844 A | 8/2018 |
| JP | 2018-159349 A | 10/2018 |
| JP | 2018-178810 A | 11/2018 |

* cited by examiner

MISFIRE DETECTION DEVICE FOR INTERNAL COMBUSTION ENGINE, MISFIRE DETECTION SYSTEM FOR INTERNAL COMBUSTION ENGINE, DATA ANALYZER, CONTROLLER FOR INTERNAL COMBUSTION ENGINE, METHOD FOR DETECTING MISFIRE OF INTERNAL COMBUSTION ENGINE, AND RECEPTION EXECUTION DEVICE

BACKGROUND

1. Field

The following description relates to a misfire detection device for an internal combustion engine, a misfire detection system for an internal combustion engine, a data analyzer, a controller for an internal combustion engine, a method for detecting a misfire of an internal combustion engine, and a reception execution device.

2. Description of Related Art

For example, Japanese Laid-Open Patent Publication No. 2009-174397 describes a device that determines whether a misfire is present. Top dead center (TDC) timing refers to timing at which a piston reaches a compression top dead center in a cylinder. A required rotation time refers to a time the crankshaft takes to rotate an angular interval that corresponds to a period from a first TDC timing of a cylinder to a second TDC timing of another cylinder that is adjacent, in terms of time series, to the cylinder. The term "compression top dead center" may refer to a crank angle at which the piston reaches the compression top dead center in the cylinder. The device described above uses the required rotation time as a variable related to the rotational speed of the crankshaft corresponding to a combustion stroke of each cylinder. The device determines whether a misfire is present based on a comparison of a determination value with the difference between required rotation times.

The crankshaft shows a complicated rotational behavior in an angular interval between compression top dead centers that are adjacent to each other in terms of time series. However, in the device described above, the rotational behavior of the crankshaft is averaged at each of multiple angular intervals that are shorter than the angular interval between compression top dead centers. Hence, the device determines whether an abnormality is present based on only the averaged rotational behavior, and may not always determine whether a misfire is present based on a variable having a high sensitivity to variation in rotational behavior corresponding to presence of a misfire. For the determination value that is compared with the difference, an appropriate value varies in accordance with, for example, the operating point of the internal combustion engine. This increases the number of man-hours for adaptation. As a proposed solution to this problem, rotational behavior of the crankshaft at an angular interval that is shorter than the angular interval between compression top dead centers may be input to a learned model by machine learning. However, in this case, a variable that indicates the rotational behavior of the crankshaft at an angular interval shorter than the angular interval between the compression top dead centers is used as an input variable. This increases the dimension of the input variable and increases the calculation load.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Hereinafter, a plurality of modes of the present disclosure and the operation and effects will be described.

Aspect 1. An aspect of the present disclosure provides a misfire detection device for an internal combustion engine. The misfire detection device includes a storage device and processing circuitry. The storage device stores mapping data. The mapping data is data specifying a mapping that outputs a misfire variable using a rotation waveform variable as an input. The misfire variable is a variable related to a probability that a misfire has occurred in the internal combustion engine. The processing circuitry is configured to execute an acquiring process that acquires the rotation waveform variable based on a detection value of a sensor configured to detect a rotational behavior of a crankshaft of the internal combustion engine, a determination process that determines whether the misfire is present based on an output of the mapping that uses a variable acquired by the acquiring process as an input, and a handling process that operates predetermined hardware, when the determination process determines that a misfire has occurred, to occurrence of the misfire. A domain of a rotational angle of the crankshaft is divided into multiple continuous rotational angle intervals. The rotation waveform variable is a variable based on an instantaneous speed variable corresponding to each of discontinuous rotational angle intervals selected from the multiple continuous rotational angle intervals. A cylinder that is subject to detection for misfire is a target cylinder. The rotation waveform variable is a variable including information related to a difference between a value of the instantaneous speed variable corresponding to a compression top dead center of the target cylinder and a value of the instantaneous speed variable corresponding to a compression top dead center of a cylinder differing from the target cylinder. An interval between rotational angles at which the compression top dead centers are reached is a reaching interval. The instantaneous speed variable is a variable related to an instantaneous speed. The instantaneous speed is a rotational speed of the crankshaft in a rotational angle interval that is shorter than the reaching interval. The mapping data includes data learned by machine learning.

In the above configuration, the value of the misfire variable is calculated using data learned by machine learning, and whether a misfire is present is determined based on the calculated value of the misfire variable. This reduces the number of man-hours for adaptation. The rotation waveform variable used as the input to the mapping specified by mapping data learned by machine learning is a variable based on instantaneous speed variables corresponding to discontinuous ones of the rotational angle intervals selected from the continuous rotational angle intervals. This reduces the dimensions of the input variable as compared to a configuration in which the instantaneous speed variable corresponding to all of the continuous rotational angle intervals is used as the input. The rotation waveform variable indicates the difference between the value of the instantaneous speed variable corresponding to the compression top dead center of the target cylinder, which is subject to detection for a misfire, and the value of the instantaneous speed variable corresponding to the compression top dead center of a cylinder other than the target cylinder. In the above configuration, the variable is configured so that the difference is notable in accordance with whether a misfire is present. With the above configuration, while utilizing information needed to determine whether a misfire is present, the load of calculation for the determination of presence of misfire is reduced.

Aspect 2. In the misfire detection device according to aspect 1, the input to the mapping includes an operating point variable. The operating point variable is a variable specifying an operating point of the internal combustion engine. The acquiring process includes a process that acquires the operating point variable. The determination process includes a process that determines whether the misfire is present based on an output of the mapping that further uses the operating point variable acquired by the acquiring process as the input to the mapping. The mapping outputs a value of the misfire variable through a join operation of the rotation waveform variable, the operating point variable, and a parameter learned by the machine learning.

The instantaneous speed variable difference is the difference between the instantaneous speed variable corresponding to the compression top dead center of the target cylinder, which is subject to detection for whether a misfire is present, and the instantaneous speed variable corresponding to the compression top dead center of a cylinder differing from the target cylinder. The instantaneous speed variable difference varies in accordance with the operating point of the internal combustion engine. The degree of deviation of the instantaneous speed variable difference when a misfire occurs from the instantaneous speed variable difference when a misfire does not occur also varies in accordance with the operating point of the internal combustion engine. Therefore, when a determination value for determining whether a misfire is present is set for an instantaneous speed variable difference, and whether a misfire is present is determined based on a comparison between the instantaneous speed variable difference and the determination value, the determination value needs to be adapted for every operating point. In this regard, in the above configuration, machine learning is executed for a mapping that outputs a value of the misfire variable through a join operation of the rotation waveform variable, the operating point variable, and the parameter learned by machine learning. This allows for learning of a parameter that is common to the operating points differing from each other.

Aspect 3. In the misfire detection device according to aspect 1, the rotation waveform variable includes an inter-cylinder variable and a fluctuation pattern variable. The inter-cylinder variable is a variable obtained by quantifying a difference between a value of the instantaneous speed variable corresponding to the compression top dead center of the target cylinder and a value of the instantaneous speed variable corresponding to the compression top dead center of the cylinder differing from the target cylinder. The target cylinder and the cylinder differing from the target cylinder are a first set of cylinders. Two cylinders differing from the first set of cylinders are a second set of cylinders. The fluctuation pattern variable is a variable obtained by quantifying a relationship between the difference between the values of the instantaneous speed variable in the first set of cylinders and a difference between values of the instantaneous speed variable in the second set of cylinders. The mapping outputs a value of the misfire variable through a join operation of the inter-cylinder variable, the fluctuation pattern variable, and a parameter learned by the machine learning.

For example, vibrations from the road surface are superimposed on the crankshaft. This may cause an erroneous determination when whether misfire is present is determined from only the inter-cylinder variables. In this regard, in the above configuration, the value of the misfire variable is calculated using the fluctuation pattern variable in addition to the inter-cylinder variable. Thus, the value of the misfire variable shows the magnitude of the probability that a misfire has occurred more accurately than that a value of the misfire variable that is calculated from only the inter-cylinder variables. Further, in the above configuration, the value of the misfire variable is calculated through the join operation of the inter-cylinder variable and the fluctuation pattern variable. Therefore, whether a misfire is present is determined taking into considering the relationship between presence of a misfire and the values of the inter-cylinder variable and the fluctuation pattern variable in more detail than a configuration in which whether a misfire is present is determined based on a comparison of the inter-cylinder variable with the determination value and a comparison of the value of the fluctuation pattern variable with the determination value.

Aspect 4. In the misfire detection device according to any one of aspects 1 to 3, the target cylinder and the cylinder differing from the target cylinder are two cylinders in which the compression top dead centers are consecutively reached.

Various factors may affect a difference in instantaneous speed between two cylinders in which compression top dead centers are consecutively reached. In this regard, in the above configuration, the value of the misfire variable is calculated based on information related to the difference in instantaneous speed between two cylinders in which compression top dead centers are consecutively reached. This minimizes inclusion of information other than whether a misfire is present in the difference in instantaneous speed.

Aspect 5. In the misfire detection device according to any one of aspects 1 to 3, an interval between a rotational angle of the crankshaft at which the compression top dead center is reached in the target cylinder and a rotational angle of the crankshaft at which the compression top dead center is reached in the cylinder differing from the target cylinder is an interval of one rotation of the crankshaft.

A detection error corresponding to the angle of the crankshaft may occur in the value of the instantaneous speed variable. In this regard, the above configuration uses the difference in instantaneous speed between two cylinders in which the interval between the compression top dead centers is to the interval of one rotation of the crankshaft. This limits superimposition of a detection error corresponding to the angle onto the difference in instantaneous speed.

Aspect 6. In the misfire detection device according to any one of aspects 1 to 5, the mapping data includes continuous misfire data that specifies a mapping for detecting a continuous misfire, in which a misfire continuously occurs in one cylinder, and random misfire data that specifies a mapping for detecting a random misfire, in which a misfire randomly occurs in multiple cylinders. The determination process includes a continuous misfire determination process that determines whether the continuous misfire is present based on an output of the mapping specified by the continuous misfire data that uses the variable acquired by the acquiring process as the input, and a random misfire determination process that determines whether the random misfire is present based on an output of the mapping specified by the random misfire data that uses the variable acquired by the acquiring process as the input.

The rotational behavior of the crankshaft differs between a random misfire and a continuous misfire. When a single mapping is used to determine a random misfire and a continuous misfire with high accuracy, requirements of the mapping are increased. This may complicate the structure of the mapping. In this regard, in the above configuration, mapping data includes random misfire data and continuous misfire data, so that a random misfire and a continuous misfire are determined with high accuracy while simplifying the structure of each mapping.

Aspect 7. In the misfire detection device according to any one of aspects 1 to 6, the processing circuitry is configured to execute a decreasing process that decreases a phase deviation of a value of the instantaneous speed variable caused by torsion of the crankshaft and an input shaft mechanically connected to the crankshaft based on a difference between the value of the instantaneous speed variable of the crankshaft and speed of the input shaft. The rotation waveform variable acquired by the acquiring process is calculated based on an output of the decreasing process.

When a misfire occurs, the phase in which the instantaneous speed of the crankshaft is the local minimum varies depending on whether or not torsion occurs in the crankshaft and the input shaft. In order to determine whether a misfire is present with high accuracy even when torsion occurs, the presence of a misfire may be determined, for example, based on all of the values of the instantaneous speed variable at successive angular intervals. This increases the dimensions of the input variable of the mapping and the calculation load. In the above configuration, the decreasing process is used so that only some of the values of the instantaneous speed variable are used to determine whether a misfire is present with high accuracy regardless of whether the torsion is present or not.

Aspect 8. An aspect of the present disclosure provides a misfire detection system for an internal combustion engine. The misfire detection system includes the processing circuitry and the storage device according to any one of aspects 1 to 7. The determination process includes an output value calculation process that calculates an output value of the mapping that uses the variable acquired by the acquiring process as the input. The processing circuitry includes a first execution device and a second execution device. The first execution device is at least partially mounted on a vehicle and is configured to execute the acquiring process, a vehicle-side transmitting process that transmits data acquired by the acquiring process to outside the vehicle, a vehicle-side receiving process that receives a signal based on a calculation result of the output value calculation process, and the handling process. The second execution device is configured to execute an external-side receiving process that receives data transmitted by the vehicle-side transmitting process, the output value calculation process, and an external-side transmitting process that transmits a signal based on the calculation result of the output value calculation process to the vehicle.

In the above configuration, the output value calculation process is executed outside the vehicle, so that the calculation load of the in-vehicle device is reduced.

Aspect 9. An aspect of the present disclosure provides a data analyzer that includes the second execution device and the storage device according to aspect 8.

Aspect 10. An aspect of the present disclosure provides a controller for an internal combustion engine. The controller includes the first execution device according to aspect 8.

Aspect 11. An aspect of the present disclosure provides a method for detecting a misfire of an internal combustion engine. The method includes causing a computer to execute the acquiring process, the determination process, and the handling process according to any one of aspects 1 to 7.

The above method obtains the same effects as the configurations described in aspects 1 to 7.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

Hereinafter, a first embodiment related to a misfire detection device for an internal combustion engine will be described with reference to the drawings.

Figure 1:
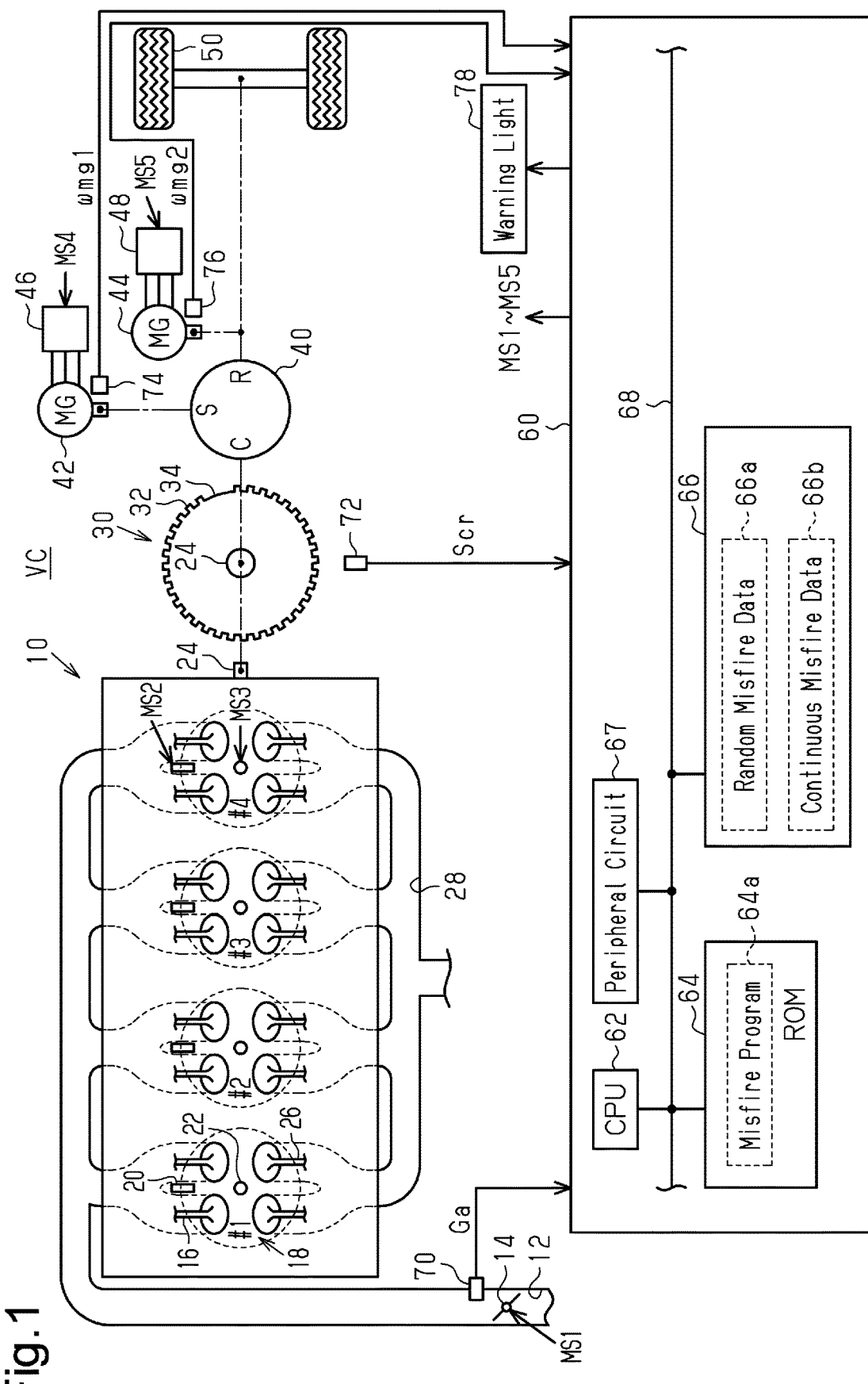
FIG. 1 is a diagram showing configurations of a controller and a drive system of a vehicle according to a first embodiment.

FIG. 1 shows an internal combustion engine 10 that is mounted on a vehicle VC and includes a throttle valve 14 provided in an intake passage 12. When an intake valve 16 is open, air is drawn from the intake passage 12 into a combustion chamber 18 of each of the cylinders #1 to #4. Fuel is injected into the combustion chamber 18 by a fuel injection valve 20. The air-fuel mixture of air and fuel is subject to combustion when an ignition device 22 produces spark discharge in the combustion chamber 18, and the energy generated by the combustion is output as rotation energy of a crankshaft 24. When an exhaust valve 26 is open, the air-fuel mixture subject to the combustion is discharged to an exhaust passage 28 as exhaust air.

The crankshaft 24 is coupled to a crank rotor 30 provided with teeth 32 respectively indicating multiple (thirty-four, in this case) rotational angles of the crankshaft 24. The crank rotor 30 is basically provided with the teeth 32 at intervals of 10° CA. However, there is a missing tooth 34, which is a location where the interval of adjacent ones of the teeth 32 is 30° CA. This indicates a reference rotational angle of the crankshaft 24.

The crankshaft 24 is mechanically connected to a carrier C of a planetary gear mechanism 40 configuring a power split mechanism. The planetary gear mechanism 40 includes a sun gear S that is mechanically connected to the rotation shaft of a first motor generator 42 and a ring gear R that is mechanically connected to the rotation shaft and the drive wheel 50 of a second motor generator 44. An alternating current (AC) voltage is applied to each terminal of the first motor generator 42 by an inverter 46, and an AC voltage is applied to each terminal of the second motor generator 44 by an inverter 48.

The controller 60 controls the internal combustion engine 10 and operates operation units of the internal combustion engine 10 such as the throttle valve 14, the fuel injection valve 20, and the ignition device 22 to control the control aspects such as the torque and the exhaust component ratio. The controller 60 also controls the first motor generator 42 and operates the inverter 46 to control the torque and the rotational speed, which are control aspects. The controller 60 also controls the second motor generator 44 and operates the inverter 48 to control the torque and the rotational speed, which are control aspects. FIG. 1 shows operation signals MS1 to MS5 of the throttle valve 14, the fuel injection valve 20, the ignition device 22, and the inverters 46 and 48, respectively.

When controlling the control aspects, the controller 60 references an intake air amount Ga detected by an air flow meter 70, an output signal Scr of a crank angle sensor 72, and a rotational speed $\omega mg1$ of the first motor generator 42 detected by a first speed sensor 74, and a rotational speed $\omega mg2$ of the second motor generator 44 detected by a second speed sensor 76.

The controller 60 includes a CPU 62, a ROM 64, a storage device 66 that is an electrically rewritable non-volatile memory, and a peripheral circuit 67, which are configured to communicate with each other through a local network 68. The peripheral circuit 67 includes, for example, a circuit that generates a clock signal regulating an internal operation, a power supply circuit, a reset circuit.

The controller 60 controls the control aspects with the CPU 62 executing programs stored in the ROM 64.

Figure 2:
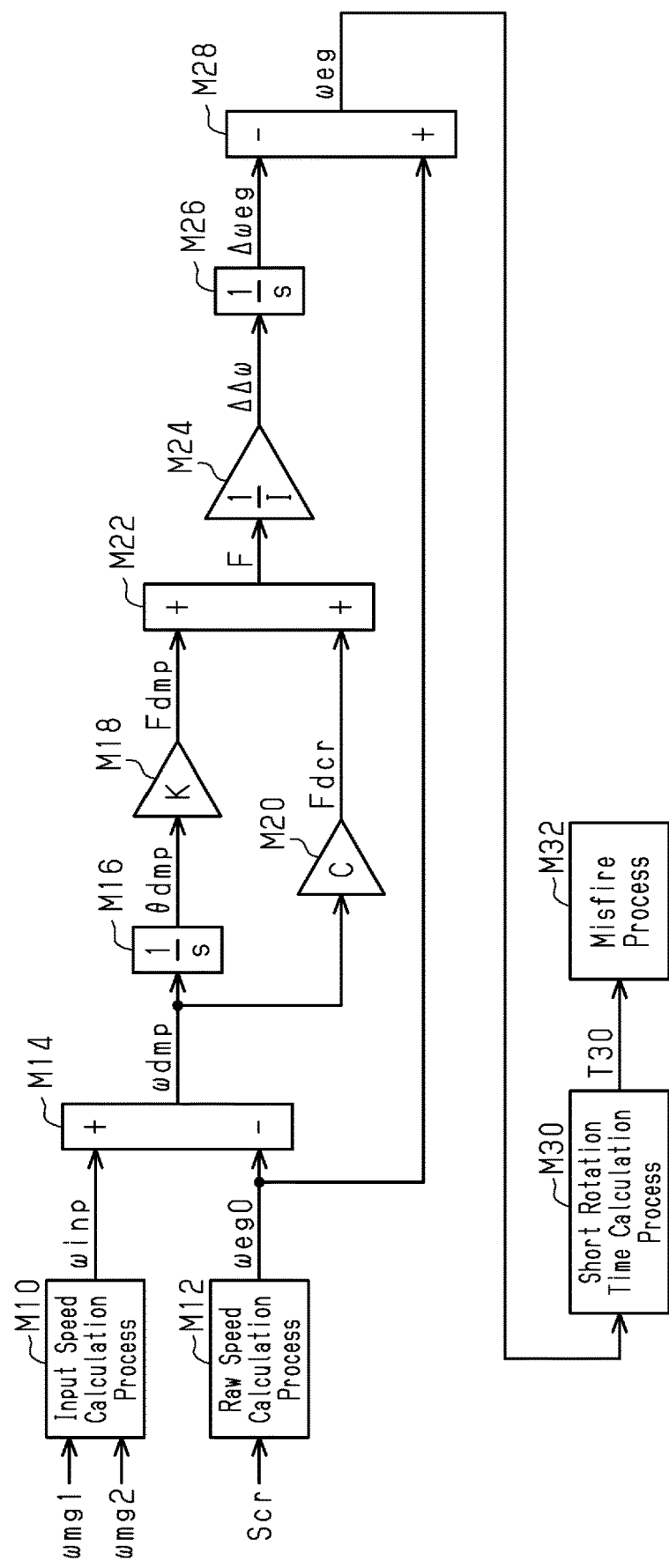
FIG. 2 is a block diagram showing some of the processes executed by the controller according to the first embodiment.

FIG. 2 shows some of the processes implemented by the CPU 62 executing the programs stored in the ROM 64.

An input speed calculation process M10 calculates an input speed $\omega inp$, which is the speed of the carrier C of the planetary gear mechanism 40, based on the rotational speeds $\omega mg1$ and $\omega mg2$.

A raw speed calculation process M12 calculates a raw speed $\omega eg0$ based on the output signal Scr. The raw speed $\omega Deg0$ is a speed at which the crankshaft 24 is rotated by an angular interval (e.g., 30° CA) that is less than a reaching interval of compression top dead centers. The reaching interval of compression top dead centers refers to an interval between rotational angles of the crankshaft 24 at which compression top dead centers are reached.

A speed difference calculation process M14 subtracts the raw speed $\omega eg0$ from the input speed $\omega inp$ to calculate the speed difference $\omega dmp$.

A torsion angle calculation process M16 uses the speed difference $\omega dmp$ as an input to calculate a torsion angle $\theta dmp$ based on an integral element.

An elastic force calculation process M18 multiplies the torsion angle $\theta dmp$ by an elastic coefficient K to calculate an elastic force Fdmp.

An attenuation component calculation process M20 multiplies the speed difference $\omega dmp$ by an attenuation coefficient C to calculate an attenuation component Fdcr.

A torsion force calculation process M22 adds the elastic force Fdmp and the attenuation component Fdcr to calculate a torsion force F.

An acceleration calculation process M24 divides the torsion force F by an inertia coefficient I to calculate an acceleration $\Delta\Delta\omega$.

A damper torsional vibration component calculation process M26 calculates a damper torsional vibration component $\Delta\omega eg$ as an output value of the integral element that uses the acceleration $\Delta\Delta\omega$ as an input. A torsion elimination instantaneous speed calculation process M28 subtracts the damper torsional vibration component $\Delta\omega eg$ from the raw speed $\omega eg0$ to calculate a torsion elimination instantaneous speed $\omega eg$. The torsion elimination instantaneous speed $\omega eg$ is a speed obtained by eliminating a phase deviation of the rotational behavior of the crankshaft 24 caused by torsion between the side of the carrier C and the side of the crankshaft 24 of the planetary gear mechanism 40.

A short rotation time calculation process M30 calculates a time that the crankshaft 24 takes to rotate 30° CA (short rotation time T30) based on the torsion elimination instantaneous speed $\omega eg$. In the present embodiment, short rotation times T30 that are adjacent to each other in terms of time series indicate a time taken to make a rotation of 30° CA angular intervals that are adjacent to each other. The angular intervals do not overlap each other. The crankshaft has a domain of a rotational angle that is divided into multiple continuous rotational angle intervals.

A misfire process M32 executes determination of whether a misfire is present based on short rotation time T30.

Figure 3:
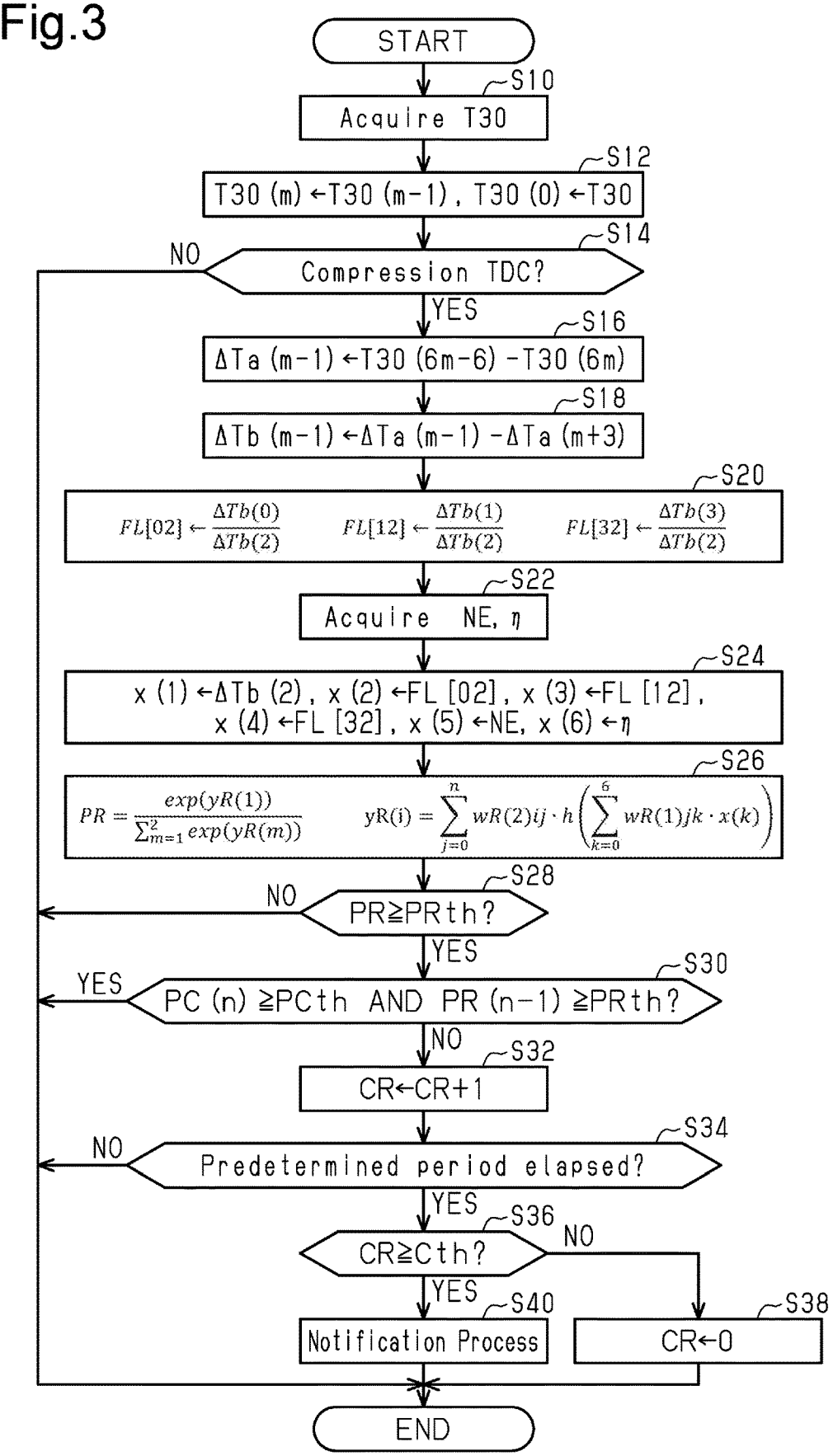
FIG. 3 is a flowchart showing the procedures of a process specified in a misfire program according to the first embodiment.

FIG. 3 shows the procedures of a process related to an abnormality that generates random misfires in the misfire process M32. The process shown in FIG. 3 is implemented by the CPU 62 repeatedly executing a misfire program 64a stored in the ROM 64 in, for example, a predetermined cycle. Hereinafter, the step number of each process is represented by the number with "S" in front.

In a series of processes shown in FIG. 3, the CPU 62 acquires short rotation time T30 (S10). The CPU 62 sets the latest short rotation time T30 acquired in the process of S10 to short rotation time T30(0), and increases the value of a variable "m" in short rotation time T30(m) for older values (S12). More specifically, when "m=1, 2, 3, . . . ," short rotation time T30(m–1) immediately before execution of the process of S12 is set to short rotation time T30(m). For example, short rotation time T30 acquired by the process of S10 in the previous execution of the process of FIG. 3 is set to short rotation time T30(1).

Then, the CPU 62 determines whether short rotation time T30 acquired in the process of S10 is the time taken to make a rotation of an angular interval from 30° CA in advance of a compression top dead center of any one of the cylinders #1 to #4 to the compression top dead center (S14). When it is determined that short rotation time T30 is the time taken to make a rotation of the angular interval to the compression top dead center (S14: YES), the CPU 62 calculates the value of a rotation waveform variable, which is used as an input to a process for determining whether a misfire is present, to determine whether a misfire is present in the cylinder that reached the compression top dead center at an angle advanced by 360° CA.

More specifically, the CPU 62 calculates a difference between values of short rotation times T30, related to the angular interval from 30° CA in advance of a compression top dead center to the compression top dead center, separated from each other by 180° as an inter-cylinder variable ΔTa (S16). This process sets "T30(6m−6)−T30(6m)" to the inter-cylinder variable ΔTa(m−1) where "m=1, 2, 3, . . . ."

Figure 4:
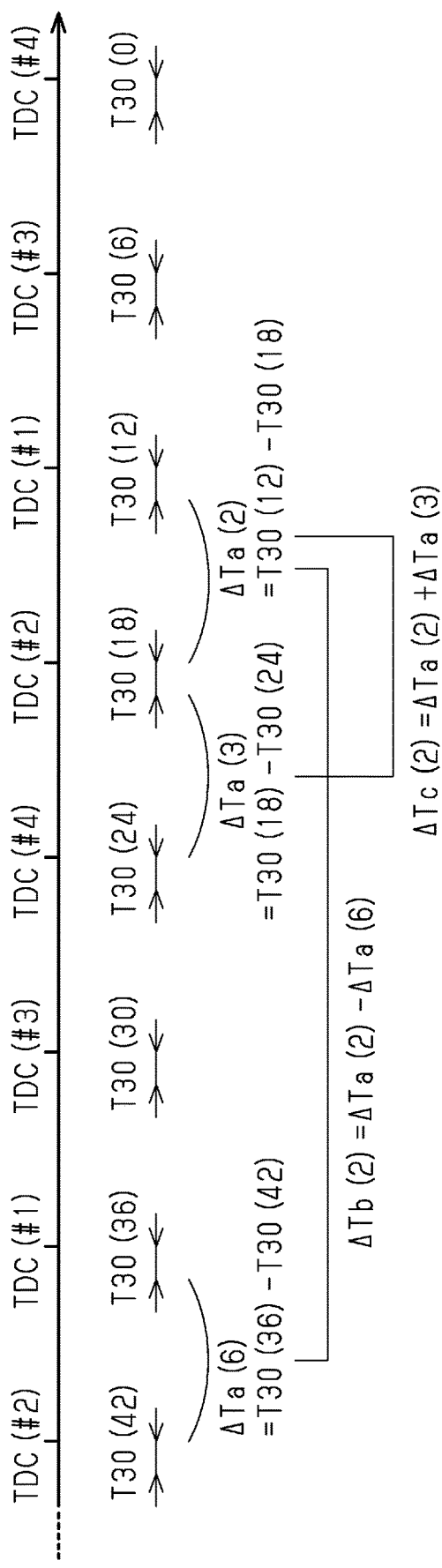
FIG. 4 is a time chart showing input variables of a mapping according to the first embodiment.

FIG. 4 shows the inter-cylinder variable ΔTa. In the present embodiment, the compression top dead centers are reached in the order of the cylinder #1, the cylinder #3, the cylinder #4, and the cylinder #2, and combustion stroke is performed in this order. FIG. 4 shows an example in which short rotation time T30(0) of an angular interval of cylinder #4 from 30° CA in advance of a compression top dead center to the compression top dead center is acquired in the process of S10, so that cylinder #1 is subject to detection for misfire. In this case, the inter-cylinder variable ΔTa(0) is the difference in short rotation time T30 corresponding to compression top dead center between cylinder #4 and cylinder #3, which reached the compression top dead center immediately before cylinder #4. FIG. 4 shows that the inter-cylinder variable ΔTa(2) is the difference between short rotation time T30(12), which corresponds to the compression top dead center of cylinder #1 subject to detection for misfire, and short rotation time T30(18), which corresponds to the compression top dead center of cylinder #2.

Referring again to FIG. 3, the CPU 62 calculates an inter-cylinder variable ΔTb, which is a difference between values of the inter-cylinder variables ΔTa(0), ΔTa(1), ΔTa(2), . . . , that are separated from each other by 720° CA (S18). This process sets the inter-cylinder variable "ΔTa(m−1)−ΔTa(m+3)" to ΔTb(m−1) where "m=1, 2, 3, . . . ."

FIG. 4 shows an example of the inter-cylinder variable ΔTb. FIG. 4 shows that the inter-cylinder variable ΔTb(2) is "ΔTa(2)−Ta(6)."

Referring again to FIG. 3, the CPU 62 calculates a fluctuation pattern variable FL indicating a relative magnitude relationship between the inter-cylinder variable ΔTb corresponding to the cylinder subject to the detection for a misfire and the inter-cylinder variable ΔTb corresponding to other cylinders (S20). In the present embodiment, the fluctuation pattern variables FL[02], FL[12], FL[32] are calculated.

The fluctuation pattern variable FL[02] is defined by "ΔTb(0)/ΔTb(2)." More specifically, when using the example of FIG. 4, the fluctuation pattern variable FL[02] is a value obtained by dividing the inter-cylinder variable ΔTb(0) corresponding to the cylinder #4 by the inter-cylinder variable ΔTb(2) corresponding to the cylinder #1 subject to detection for misfire. In this example, the cylinder #4 reaches the compression top dead center after the cylinder next to the cylinder #1. The fluctuation pattern variable FL [12] is defined by "ΔTb(1)/ΔTb(2)." More specifically, when using the example of FIG. 4, the fluctuation pattern variable FL[12] is a value obtained by dividing the inter-cylinder variable ΔTb(1) corresponding to the cylinder #3 by the inter-cylinder variable ΔTb(2) corresponding to the cylinder #1 subject to detection for misfire. In this case, the cylinder #3 reaches the compression top dead center immediately after the cylinder #1. The fluctuation pattern variable FL[32] is defined by "ΔTb(3)/ΔTb(2)." More specifically, when using the example of FIG. 4, the fluctuation pattern variable FL[32] is a value obtained by dividing the inter-cylinder variable ΔTb(3) corresponding to the cylinder #2 by the inter-cylinder variable ΔTb(2) corresponding to the cylinder #1 subject to detection for misfire. In this case, the cylinder #2 reaches the compression top dead center immediately before the cylinder #1.

The CPU 62 acquires the rotational speed NE and the filling efficiency η (S22).

The CPU 62 assigns the value of the rotation waveform variable acquired by the processes of S18 and S20 and the value of the variable acquired by the process of S22 to the input variables x(1) to x(6) of a mapping that outputs a misfire variable PR (S24). The misfire variable PR is a variable related to the probability that a misfire has occurred in the cylinder subject to detection for misfire. More specifically, the CPU 62 assigns the inter-cylinder variable ΔTb(2) to the input variable x(1), assigns the fluctuation pattern variable FL [02] to the input variable x(2), assigns the fluctuation pattern variable FL[12] to the input variable x(3), and assigns the fluctuation pattern variable FL[32] to the input variable x(4). In addition, the CPU 62 assigns the rotational speed NE to the input variable x(5) and assigns the filling efficiency η to the input variable x(6).

The CPU 62 inputs the input variables x(1) to x(6) to a mapping specified by the random misfire data 66a stored in the storage device 66 shown in FIG. 1 to calculate the value of the misfire variable PR which is the output value of mapping (S26).

In the present embodiment, the mapping is configured through a neural network including one intermediate layer. The neural network includes an activation function h (x) that serves as an input side nonlinear mapping nonlinearly converting an input side coefficient wR(1) jk (j=0 to n, k=0 to 6) and each output of an input side linear mapping, that is, a linear mapping specified by the input side coefficient wR(1) jk. In the present embodiment, a rectified linear unit (ReLU) is exemplified as the activation function h (x). ReLU is a function that outputs the non-lesser one of the input and zero. In the present embodiment, wR(1)j0 is one of the bias parameters, and the input variable x(0) is defined as one.

The above neural network includes a softmax function that inputs the output side coefficient wR(2) ij(i=1 to 2, j=0 to n) and original variables yR(1) and yR(2), each of which is an output of the output side linear mapping, that is, the linear mapping specified by the output side coefficient wR(2) ij, to output the misfire variable PR. Thus, in the present embodiment, the misfire variable PR quantifies the likelihood that a misfire has actually occurred as a continuous value within a predetermined range that is greater than zero and less than one.

The CPU 62 determines whether or not the value of the misfire variable PR is greater than or equal to a determination value PRth (S28). When it is determined that the value is greater than or equal to the determination value PRth (S28: YES), the CPU 62 determines whether or not a logical product of a current value PC(n) of a misfire variable PC for continuous misfire (described later) being greater than or equal to a determination value PCth, and a previous value PR(n−1) of the misfire variable PR being greater than or equal to the determination value PRth is true (S30). This process confirms that the misfire that has been affirmatively determined in the process of S28 is not a continuous misfire, which is a misfire that continuously occurs in a specific cylinder. When it is determined that the logical product is false (S30: NO), the CPU 62 increments the random misfire counter CR (S32). The CPU 62 determines whether or not a predetermined period has elapsed from the point in time when the process of S28 was executed for the first time or the point in time when the process of S38 (described later) was executed (S34). The predetermined period is longer than the period of one combustion cycle and may be ten times or longer than one combustion cycle.

When it is determined that the predetermined period has elapsed (S34: YES), the CPU 62 determines whether the random misfire counter CR is greater than or equal to a threshold value Cth (S36). This process determines whether the frequency of occurrence of misfire exceeds the allowable range. When it is determined that the random misfire counter is less than the threshold value Cth (S36: NO), the CPU 62 initializes a random misfire counter CR (S38). When it is determined that the random misfire counter is greater than or equal to the threshold value Cth (S36: YES), the CPU 62 executes a notification process for operating a warning light 78 shown in FIG. 1 to prompt the user to respond to the abnormality (S40).

When the process of S38 or S40 is completed, an affirmative determination is made in the process of S30, and a negative determination is made in the process of S14, S28, or S34, the CPU 62 temporarily terminates the series of processes shown in FIG. 3.

The random misfire data 66a is generated, for example, in the following manner. A dynamometer is connected to the crankshaft 24 and the internal combustion engine 10 is driven on a test bench. A point in time is randomly selected from points in time at which a requested fuel is injected to the cylinders #1 to #4, and the fuel injection is stopped at the selected point in time. For a cylinder in which fuel injection is stopped, data in which the value of a misfire variable PR is one is used as teacher data. For a cylinder in which fuel injection is not stopped, data in which the value of the misfire variable PR is zero is included in teacher data. Then, each rotation waveform variable and the value of the variable acquired by the process of S22 are used to calculate the value of misfire variable PR through processes similar to the processes of S24 and S26. The values of the input side coefficient wR(1) jk and the output side coefficient wR(2) ij are learned so as to reduce the difference between the value of misfire variable PR calculated as described above and the teacher data. More specifically, for example, the values of the input side coefficient wR(1) jk and the output side coefficient wR(2) ij may be learned so as to minimize the tolerance entropy.

Figure 5:
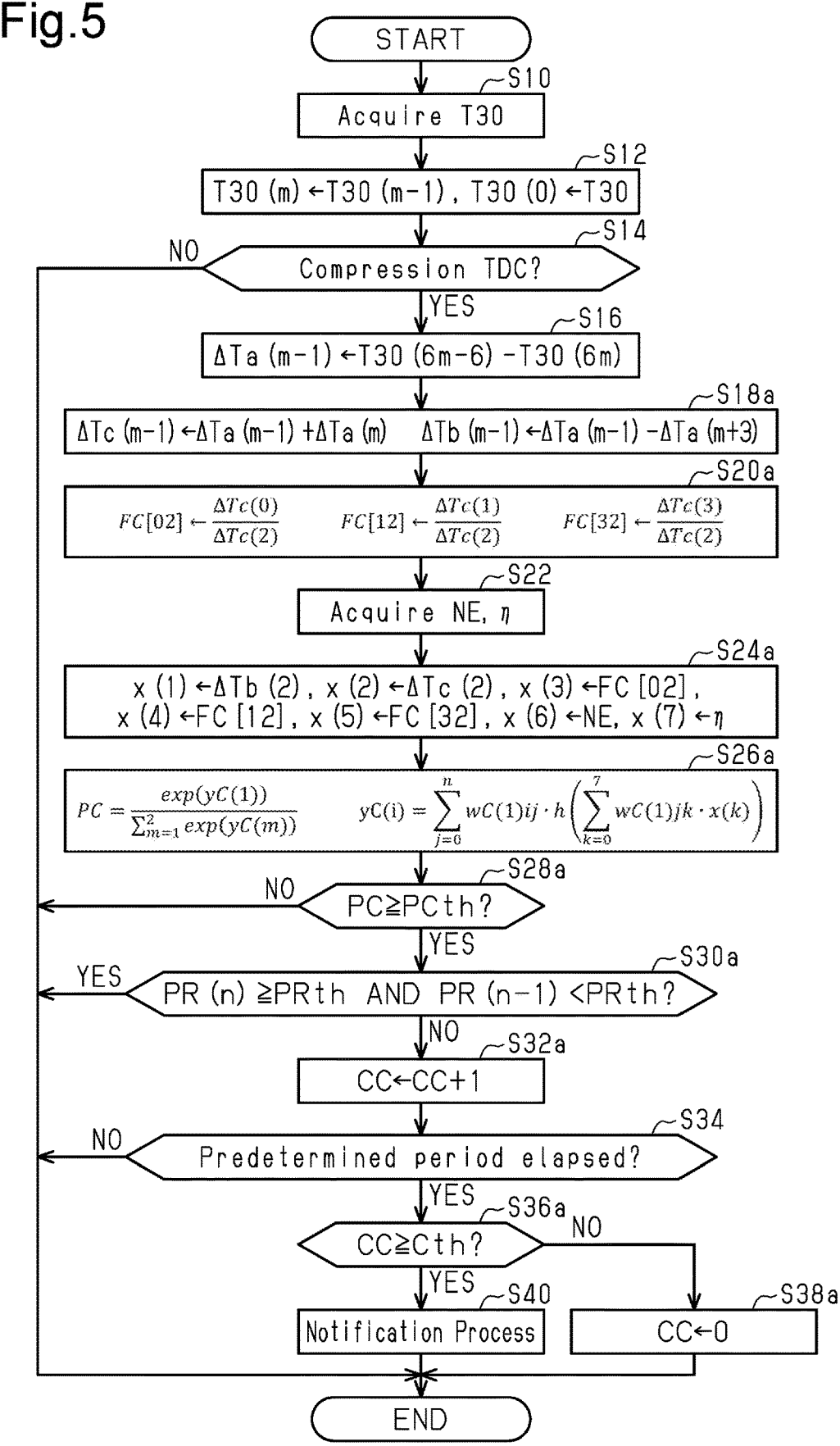
FIG. 5 is a flowchart showing the procedures of a process specified in the misfire program according to the first embodiment.

FIG. 5 shows the procedures of a process related to misfire that continuously occurs in a specific cylinder in the misfire process M32. The process shown in FIG. 5 is implemented by the CPU 62 repeatedly executing the misfire program 64a stored in the ROM 64 in, for example, a predetermined cycle. For the sake of convenience, in FIG. 5, the same step number is given to a process corresponding to the process shown in FIG. 3.

In a series of processes shown in FIG. 5, when the process of S16 is completed, the CPU 62 calculates the inter-cylinder variable ΔTb, and calculates the difference between values of short rotation times T30, related to the angular interval from 30° CA in advance of a compression top dead center to the compression top dead center, separated from each other by 360° as the inter-cylinder variable ΔTc (S18a). This process sets "ΔTa(m−1)+ΔTa(m)" to the inter-cylinder variable ΔTc(m−1) where "m=1, 2, 3, . . . ."

FIG. 4 shows that the inter-cylinder variable ΔTc(2) is "ΔTa(2)+ΔTa(3)." Since the inter-cylinder variable ΔTa(2) is "T30(12)−T30(18)" and the inter-cylinder variable ΔTa(3) is "T30(18)−(24)", the inter-cylinder variable ΔTc(2) is "T30(12)−T30(24)."

The CPU 62 calculates a fluctuation pattern variable FC indicating a relative magnitude relationship between the inter-cylinder variable ΔTc corresponding to a cylinder that is subject to detection for misfire and the inter-cylinder variable ΔTc corresponding to the other cylinders (S20a). In the present embodiment, the fluctuation pattern variables FC[02], FC[12], FC[32] are calculated.

The fluctuation pattern variable FC[02] is defined by "ΔTc(0)/ΔTc(2)." More specifically, when using the example of FIG. 4, the fluctuation pattern variable FL[02] is a variable obtained by dividing the inter-cylinder variable ΔTc(0) corresponding to the cylinder #4 by the inter-cylinder variable ΔTb(2) corresponding to the cylinder #1 subject to detection for misfire. In this case, the cylinder #4 reaches the compression top dead center after the cylinder next to the cylinder #1. The fluctuation pattern variable FC[12] is defined by "ΔTc(1)/ΔTc(2)." More specifically, when using the example of FIG. 4, the fluctuation pattern variable FL[12] is a variable obtained by dividing the inter-cylinder variable ΔTc(1) corresponding to the cylinder #3 by the inter-cylinder variable ΔTc(2) corresponding to the cylinder #1 subject to detection for misfire. In this case, the cylinder #3 reaches the compression top dead center immediately after the cylinder #1. The fluctuation pattern variable FC[32] is defined by "ΔTc(3)/ΔTc(2)." More specifically, when using the example of FIG. 4, the fluctuation pattern variable FL[32] is a variable obtained by dividing the inter-cylinder variable ΔTc(3) corresponding to the cylinder #2 by the inter-cylinder variable ΔTc(2) corresponding to the cylinder #1 subject to detection for misfire. In this case, the cylinder #2 reaches the compression top dead center immediately before the cylinder #1.

After executing the process of S22, the CPU 62 assigns the value of the rotation waveform variable acquired by the processes of S18a and S20a and the value of the variable acquired by the process of S22 to the input variables x(1) to x(7) of a mapping that outputs the misfire variable PC, which is a variable related to the probability that the misfire has continuously occurred in the cylinder subject to the detection (S24a). That is, the CPU 62 assigns the inter-cylinder variable ΔTb(2) to the input variable x(1), assigns the inter-cylinder variable ΔTc(2) to the input variable x(2), assigns the fluctuation pattern variable FC[02] to the input variable x(3), assigns the fluctuation pattern variable FC[12] to the input variable x(4), and assigns the fluctuation pattern variable FC[32] to the input variable x(5). In addition, the CPU 62 assigns the rotational speed NE to the input variable x(6) and assigns the filling efficiency 11 to the input variable x(7).

The CPU 62 inputs the input variables x(1) to x(7) into a mapping specified by continuous misfire data 66b stored in the storage device 66 shown in FIG. 1 to calculate the value of the misfire variable PC, which is the output value of the mapping (S26a).

In the present embodiment, the mapping is configured through a neural network including one intermediate layer. The neural network described above includes an activation function h (x) that serves as an input side nonlinear mapping nonlinearly converting the input side coefficient wC(1) jk (j=0 to n, k=0 to 7) and each output of the input side linear mapping, that is, the linear mapping specified by the input side coefficient wC(1) jk. In the present embodiment, ReLU is exemplified as the activation function h (x). In the present embodiment, wC(1)j0 is one of the bias parameters, and the input variable x(0) is defined as one.

The neural network described above includes a softmax function that inputs the output side coefficient wC(2) ij(i=1 to 2, j=0 to n) and the original variables yC(1) and yC(2), each of which is an output of the output side linear mapping, that is, the linear mapping specified by the output side coefficient wC(2) ij, to output the misfire variable PC.

The CPU 62 determines whether or not the value of the misfire variable PC is greater than or equal to the determination value PCth (S28a). When it is determined that the value is greater than or equal to the determination value PCth (S28a: YES), the CPU 62 determines whether a logical product of a current value PR(n) of the misfire variable PR for random misfire being greater than or equal to the determination value Pth, and a previous value PR(n−1) being less than the determination value Pth is true (S30a). This process determines whether the affirmative determination is made in the process of S28a because of occurrence of a continuous misfire. When it is determined that the logical product is false (S30a: NO), the CPU 62 increments the continuous misfire counter CC (S32a). The CPU 62 determines whether or not a predetermined period has elapsed from the point in time when the process of S28a was executed for the first time or from the point in time when the process of S38a (described later) was executed (S34). Here, the predetermined period is longer than the period of one combustion cycle. The predetermined period may be ten times or longer than one combustion cycle.

When it is determined that the predetermined period has elapsed (S34: YES), the CPU 62 determines whether or not the continuous misfire counter CC is greater than or equal to the threshold value Cth (S36a). This process determines whether the frequency of occurrence of misfire exceeds the allowable range. When it is determined that the continuous misfire counter CC is less than the threshold value Cth (S36a: NO), the CPU 62 initializes the continuous misfire counter CC (S38a). When it is determined that the continuous misfire counter CC is greater than or equal to the threshold value Cth (S36: YES), the CPU 62 proceeds to the process of S40.

When the process of S38a or S40 is completed, an affirmative determination is made in the process of S30a, and a negative determination is made in the process of S14, S28a, or S34, the CPU 62 temporarily terminates the series of processes shown in FIG. 5.

The continuous misfire data 66b is generated, for example, in the following manner. A dynamometer is connected to the crankshaft 24 and the internal combustion engine 10 is driven on the test bench. A point in time is selected from points in time at which a requested fuel is injected to the cylinders #1 to #4, and the fuel injection is continuously stopped in the specific cylinder corresponding to the selected point in time. For the cylinder in which fuel injection is stopped, data in which the value of the misfire variable PC is one is included in teacher data. For the cylinders in which fuel injection is not stopped, data in which the value of the misfire variable PC is zero is included in the teacher data. Each rotation waveform variable and the value of the variable acquired by the process of S22 are used to calculate the value of the misfire variable PC through processes similar to the processes of S24a and S26a. The values of the input side coefficient wC(1) jk and the output side coefficient wC(2) ij are learned so as to reduce the difference between the value of the misfire variable PC calculated as described above and the teacher data. More specifically, for example, the values of the input side coefficient wC(1) jk and the output side coefficient wC(2) ij may be learned so as to minimize the tolerance entropy.

The operations and effects of the present embodiment will be described.

The CPU 62 uses a mapping that outputs the misfire variable PR based on the rotation waveform variable and a mapping that outputs the misfire variable PC based on the rotation waveform variable to determine whether a misfire is present. The random misfire data 66a and the continuous misfire data 66b, which are mapping data that specify the above mappings, may be learned using the teacher data generated by relatively freely driving the internal combustion engine 10 while having various operating points. Thus, the number of man-hours for adaptation is reduced as compared to a configuration in which map data is adapted for each operating point based on detection of behavior of the crankshaft 24 corresponding to whether a misfire is present.

Furthermore, short rotation time T30 taken to make a rotation of a rotational angle from 30° CA in advance of a compression top dead center to the compression top dead center is selectively used to generate the rotation waveform variable, which is an input to the mapping. Thus, the dimensions of the input of the mapping are reduced as compared to a configuration that uses each short rotation time T30 in angle regions that continuously appear. This reduces the calculation load on the CPU 62.

The present embodiment described above further has the following operations and effects.

(1) The rotational speed NE and the filling efficiency η, which serve as operating point variables specifying the operating point of the internal combustion engine 10, are used as the input to the mapping. The operation amounts of the operation units of the internal combustion engine 10 such as the fuel injection valve 20 and the ignition device 22 may be determined based on the operating point of the internal combustion engine 10. Hence, the operating point variable is a variable including information related to the operation amount of each operation unit. Therefore, by using the operating point variable as the input of mapping, the value of the misfire variable PR is calculated based on the information related to the operation amount of each operation unit. Ultimately, the value of the misfire variable PR is calculated with higher accuracy while reflecting changes in the rotational behavior of the crankshaft 24 caused by the operation amounts.

In addition, by using the operating point variable as an input variable, the values of the misfire variables PR and PC are calculated through a join operation of the rotation waveform variable and the operating point variable using the input side coefficients wR(1) jk, wC(1) jk, which are parameters learned by machine learning. Thus, whether a misfire is present may be determined based on the operating point variable without the need for adaptation of an adaptation value for each operating point variable. However, for example, when comparing the value of the inter-cylinder variable ΔTb and the determination value, the determination value needs to be adapted for each operating point variable. This increases the number of man-hours for adaptation.

(2) The random misfire data 66a and the continuous misfire data 66b are provided. Since the random misfire and the continuous misfire differ in the rotational behavior of the crankshaft, when a single mapping is used to determine the random misfire and the continuous misfire with high accuracy, the requirements of the mapping are increased. This may complicate the structure of the mapping. In this regard, the present embodiment includes the random misfire data 66a and the continuous misfire data 66b, so that the random misfire and the continuous misfire are determined with high accuracy while simplifying the structure of each mapping.

(3) The rotation waveform variable, which is used as an input to the mapping that outputs the misfire variables PR and PC, is generated using short rotation time T30 calculated based on the torsion elimination instantaneous speed (Deg. The phase in which the raw speed ωeg0 is the local minimum differs between when torsion is generated in the crankshaft 24 and the carrier C (input shaft) and a misfire occurs and a when torsion is not generated and a misfire occurs. To determine whether a misfire is present with high accuracy regardless of whether torsion is present or not, the determination of whether a misfire is present may be made based on all of short rotation times T30 of each continuous angular interval. However, such a configuration increases the dimensions of input variables of the mapping and the calculation loads. In this regard, the present embodiment uses short rotation time T30 that is calculated using the torsion elimination instantaneous speed (neg. Thus, the determination of whether a misfire is present is made with high accuracy regardless of whether torsion is present or not using only short rotation times T30 of some of the angular intervals.

(4) The inter-cylinder variable ΔTb is included in the rotation waveform variable. The inter-cylinder variable ΔTb is obtained by quantifying in advance the difference in short rotation time T30 near the compression top dead center between the cylinder subject to detection for misfire and a cylinder that is adjacent to the subject cylinder in one dimension. Thus, information used to determine whether a misfire is present is efficiently obtained with a variable having a small number of dimensions.

(5) The inter-cylinder variable ΔTc is included in the rotation waveform variable. The inter-cylinder variable ΔTc is obtained by quantifying in advance the difference in short rotation time T30 near the compression top dead center between the cylinder subject to detection for misfire and a cylinder, the compression top dead center which differs by 360° CA from that of the subject cylinder in one dimension. The two short rotation times T30, the difference of which is to be obtained, are calculated based on the time interval between the same teeth 32 among the time intervals between the multiple teeth 32. Therefore, when an error occurs in the rotational angle between the teeth 32 the effect of the error is limited.

(6) In addition to the inter-cylinder variable ΔTb, the fluctuation pattern variable FL is included in the rotation waveform variable, which is used as an input to the random misfire mapping. Since, for example, vibration from the road surface is superimposed on the crankshaft 24, when the rotation waveform variable is only the inter-cylinder variable ΔTb, an erroneous determination may be made. In the present embodiment, the value of the misfire variable PR is calculated using the fluctuation pattern variable FL in addition to the inter-cylinder variable ΔTb, so that the value of the misfire variable PR indicates the likelihood (probability) that a misfire has occurred more accurately than in a configuration in which the value of the misfire variable PR is calculated only from the inter-cylinder variable ΔTb.

Moreover, in the present embodiment, the value of the misfire variable PR is calculated through a join operation of the inter-cylinder variable ΔTb and the fluctuation pattern variable FL using the input side coefficient wR(1) jk, which is a parameter learned by machine learning. Therefore, whether a random misfire is present is determined taking into consideration the relationship between presence of a misfire and the inter-cylinder variable ΔTb and the fluctuation pattern variable FL in more detail than a configuration in which the determination of whether a misfire is present is made based on a comparison of the inter-cylinder variable ΔTb with the determination value and a comparison of the fluctuation pattern variable FL with the determination value.

(7) In addition to the inter-cylinder variables ΔTb and ΔTc, the fluctuation pattern variable FC is included in the rotation waveform variable, which is used as an input to the continuous misfire mapping. Since vibration from the road surface is superimposed on the crankshaft 24, when the rotation waveform variable is only the inter-cylinder variables ΔTb and ΔTc, an erroneous determination may be made. In the present embodiment, the value of the misfire variable PC is calculated using the fluctuation pattern variable FC in addition to the inter-cylinder variable ΔTb, ΔTc, so that the value of the misfire variable PC indicates the likelihood (probability) that a misfire has occurred more accurately than a configuration in which the value of the misfire variable PC is calculated from only the inter-cylinder variables ΔTb and ΔTc.

Moreover, in the present embodiment, the value of the misfire variable PC is calculated through a join operation of the inter-cylinder variables ΔTb and ΔTc and the fluctuation pattern variable FC using the input side coefficient wC(1) jk, which is a parameter learned by machine learning. Therefore, whether a misfire is present is determined by taking into consideration the relationship between presence of a misfire and the inter-cylinder variable ΔTb and the fluctuation pattern variable FC in more detail than a configuration in which the determination of whether a misfire is present is made based on a comparison of the inter-cylinder variable ΔTb with the determination value and a comparison of the fluctuation pattern variable FC with the determination value.

Second Embodiment

A second embodiment will be described below with reference to the drawings, focusing on the differences from the first embodiment.

In the present embodiment, the calculation process of the misfire variables PR and PC is executed outside the vehicle.

Figure 6:
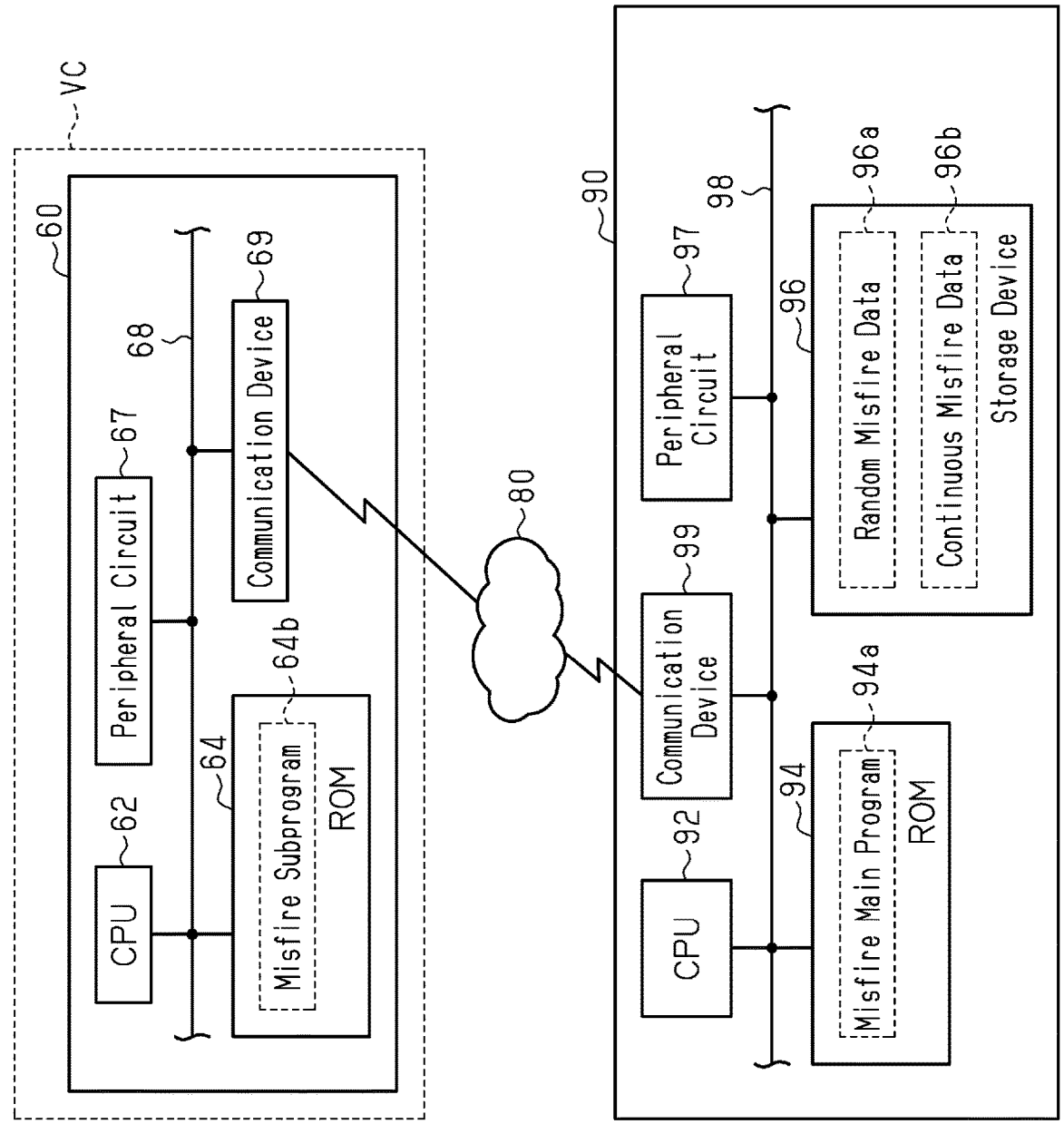
FIG. 6 is a diagram showing a configuration of a misfire detection system according to a second embodiment.

FIG. 6 shows a misfire detection system according to the present embodiment. For the sake of convenience, in FIG. 6, members corresponding to the members shown in FIG. 1 are denoted with the same reference characters.

FIG. 6 shows a controller 60 that is installed in the vehicle VC and includes a communication device 69. The communication device 69 communicates with a center 90 through the network 80 outside the vehicle VC.

The center 90 analyzes data transmitted from multiple vehicles VC. The center 90 includes a CPU 92, a ROM 94, a storage device 96, a peripheral circuit 97, and a communication device 99, which are configured to communicate with each other through a local network 98.

Figure 7:
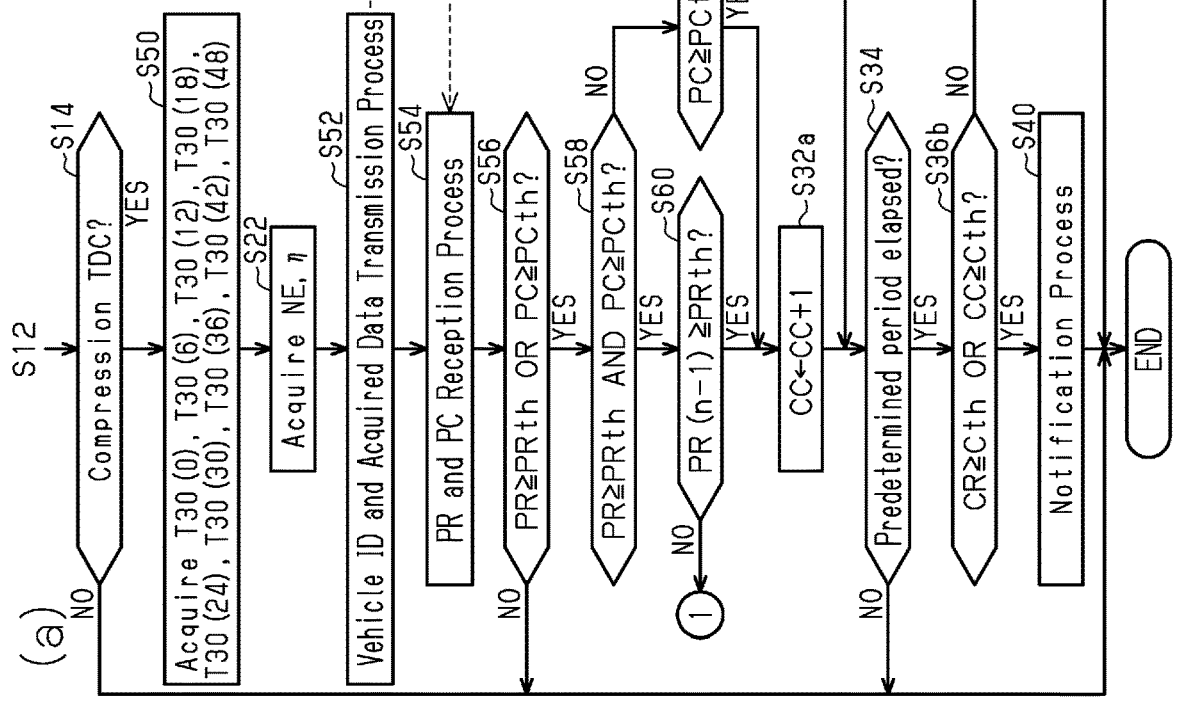
FIG. 7 is a flowchart showing the procedures of a process executed by the misfire detection system according to the second embodiment.

FIG. 7 shows the procedures of a process related to detection of misfire according to the present embodiment. The process shown in (a) in FIG. 7 is implemented by the CPU 62 executing a misfire subprogram 64b stored in the ROM 64 shown in FIG. 6. The process shown in (b) in FIG. 7 is implemented by the CPU 92 executing a misfire main program 94a stored in the ROM 94. For the sake of convenience, in FIG. 7, processes corresponding to the processes shown in FIG. 3 are denoted with the same step numbers. Hereinafter, the processes shown in FIG. 7 will be described along the time series of the misfire detection process.

That is, in the vehicle VC, after executing the processes of S10 and S12 and making an affirmative determination in the process of S14 shown in (a) in FIG. 7, the CPU 62 acquires short rotation times T30(0), T30(6), T30(12), T30 (18), T30(24), T30(30), T30(36), T30(42), and T30(48) (S50). These short rotation times T30 configure a rotation waveform variable that is a variable including information related to the difference in short rotation time T30 between angular intervals differing from each other. In particular, short rotation time T30 is a time taken to make a rotation of an angular interval from 30° CA in advance of a compression top dead center to the compression top dead center, and is a value corresponding to nine reaching timings of compression top dead center. Therefore, set data of short rotation times T30 is a variable indicating information on the difference in short rotation time T30 between compression top dead centers differing from each other. Nine short rotation times T30 described above are the entirety of short rotation times T30 that are used to calculate the inter-cylinder variable ΔTb(2) and the fluctuation pattern variables FL[02], FL [12], and FL [32]. This includes short rotation time T30 that is used to calculate the inter-cylinder variables ΔTb(2) and ΔTc(2) and the fluctuation pattern variables FC[02], FC[12], FC[32].

After executing the process of S22, the CPU 62 operates the communication device 69 to transmit the data acquired in the processes of S50 and S22 to the center 90 together with the identification information (vehicle ID) of the vehicle VC (S52).

The CPU 92 in the center 90 receives the transmitted data as shown in (b) in FIG. 7 (S60). The CPU 92 assigns the value of the variable acquired by the process of S60 to the input variables x(1) to x(11) (S62). More specifically, the CPU 62 assigns short rotation time T30(0) to the input variable x(1), assigns short rotation time T30(6) to the input variable x(2), assigns short rotation time T30(12) to the input variable x(3), and assigns short rotation time T30(18) to the input variable x(4). In addition, the CPU 92 assigns short rotation time T30(24) to the input variable x(5), assigns short rotation time T30(30) to the input variable x(6), and assigns short rotation time T30(36) to the input variable x(7). Furthermore, the CPU 92 assigns short rotation time T30(42) to the input variable x(8) and assigns short rotation time T30(48) to the input variable x(9). Moreover, the CPU 92 assigns the rotational speed NE to the input variable x(10) and assigns the filling efficiency η to the input variable x(11).

The CPU 92 inputs the input variables x(1) to x(11) to a mapping specified by the random misfire data 96a stored in the storage device 96 shown in FIG. 6 to calculate the value of the misfire variable PR which is the output value of the mapping (S64). 101141 In the present embodiment, the mapping is configured by a neural network in which the number of intermediate layers is "α," the activation functions h1 to hα of each intermediate layer are ReLU, and the activation function of the output layer is a softmax function. More specifically, when m=1, 2, . . . , "α," the value of each node of the m-th intermediate layer is generated by inputting an output of a linear mapping specified by the coefficient wR(m) to the activation function hm. In (b) in FIG. 7, n1, n2, . . . , nα are the number of nodes in the first, second, . . . , α-th intermediate layers, respectively. More specifically, for example, the value of each node in the first intermediate layer is generated by inputting the input variables x(1) to x(11) to a linear mapping specified by the coefficient wR(1)ji(j=0 to n1, i=0 to 11) to obtain an output and inputting the output to the activation function h1. Here, wR(1)j0 is one of the bias parameters, and the input variable x(0) is defined as one.

The CPU 62 inputs the input variables x(1) to x(11) to a mapping specified by the continuous misfire data 96b stored in the storage device 96 shown in FIG. 6 to calculate the value of the misfire variable PR, which is the output value of the mapping (S66).

In the present embodiment, the mapping is configured by a neural network in which the number of intermediate layers is "α," the activation functions h1 to hα of each intermediate layer are ReLU, and the activation function of the output layer is a softmax function. More specifically, when m=1, 2, . . . , α, the value of each node of the m-th intermediate layer is generated by inputting the output of a linear mapping specified by the coefficient wC(m) to the activation function hm. In (b) in FIG. 7, n1, n2, . . . , nα are the number of nodes in the first, second, . . . , α-th intermediate layers, respectively. More specifically, for example, the value of each node in the first intermediate layer is generated by inputting the input variables x(1) to x(11) to a linear mapping specified by the coefficient wC(1)ji(j=0 to n1, i=0 to 11) to obtain an output and inputting the output to the activation function h1. Here, wC(1)j0 is one of the bias parameters, and the input variable wC(0) is defined as one.

The CPU 92 operates the communication device 99 to transmit a signal indicating the values of the misfire variables PR and PC to the vehicle VC that has transmitted data received by the CPU 92 in the process of S60 (S68), and temporarily terminates the series of processes shown in (b) in FIG. 7. As shown in (a) in FIG. 7, the CPU 62 receives the values of the misfire variables PR and PC (S54), and determines whether or not the logical sum of the misfire variable PR being greater than or equal to the determination value PRth and the misfire variable PC being greater than or equal to the determination value PCth is true (S56). When it is determined that the logical sum is true (S56: YES), the CPU 62 determines whether or not the logical product of the misfire variable PR being greater than or equal to the determination value PRth and the misfire variable PC being greater than or equal to the determination value PCth is true (S58). When it is determined that the logical product is true (S58: YES), the CPU 62 determines whether or not the previous value PR(n-1) of the misfire variable PR is greater than or equal to the determination value PRth to determine whether or not a continuous misfire is present (S60). When it is determined that the previous value PR(n-1) of the misfire variable PR is greater than or equal to the determination value PRht (S60: YES), the CPU 62 proceeds to the process of S32a.

When it is determined that the logical product is false (S58: NO), the CPU 62 determines whether or not the value of the misfire variable PC is greater than or equal to the determination value PCth (S62). When it is determined that the value of the misfire variable PC is greater than or equal to the determination value PCth (S62: YES), the CPU 62 proceeds to the process of S32a.

When a negative determination is made in the process of S60 or S62, the CPU 62 proceeds to the process of S32. When the process of S32 or S32a is completed, the CPU 62 determines whether or not a predetermined period has elapsed from the point in time when the process of S56 was executed for the first time or the point in time when the process of S38b (described later) was executed (S34). Here, the predetermined period is longer than the period of one combustion cycle. The predetermined period may be ten times or longer than one combustion cycle.

When it is determined that the predetermined period has elapsed (S34: YES), the CPU 62 determines whether or not the logical sum of the random misfire counter CR being greater than or equal to the threshold value Cth and the continuous misfire counter CC being greater than or equal to the threshold value Cth is true (S36b). This process determines whether the frequency of occurrence of misfire exceeds the allowable range. When it is determined that the random misfire counter CR and the continuous misfire counter CC are less than the threshold value Cth (S36b: NO), the CPU 62 initializes the random misfire counter CR and the continuous misfire counter CC (S38b). When it is determined that the random misfire counter CR or the continuous misfire counter CC is greater than or equal to the threshold value Cth (S36b: YES), the CPU 62 proceeds to the process of S40.

When the process of S38b or S40 is completed or when a negative determination is made in the process of S14, S56, or S34, the CPU 62 temporarily terminates the series of processes shown in (a) in FIG. 7.

As described above, in the present embodiment, the values of the misfire variables PR and PC are calculated in the center 90. This reduces the calculation load on the CPU 62.

Correspondence Relationship

Correspondence relationship between the items in the embodiments described above and the items described in "Summary" is as follows. Hereinafter, the correspondence relationship is shown for each number of the aspect described in "Summary."[1,3] The misfire detection device corresponds to the controller 60. The execution device, that is, the processing circuitry, corresponds to the CPU 62 and the ROM 64. The storage device corresponds to the storage device 66. The acquiring process corresponds to the processes of S18 to S22 in FIG. 3 and the processes of S18a, S20a, and S22 in FIG. 5. The determination process corresponds to the processes of S24 to S38 in FIG. 3 and the processes of S24a to S38a in FIG. 5. The handling process corresponds to the process of S40. The rotation waveform variable corresponds to the inter-cylinder variable ΔTb(2) and the fluctuation pattern variables FL [02], FL [12], and FL [32] in the process of S26, and the inter-cylinder variables αTb(2) and αTc(2) and the fluctuation pattern variables FC[02], FC[12], and FC[32] in the process of S26a. The instantaneous speed variable corresponds to short rotation time T30.

[2] The operating point variable corresponds to the rotational speed NE and the filling efficiency q.

[4] This corresponds to a configuration in which the inter-cylinder variable ΔTb is an input variable to the mapping.

[5] This corresponds to a configuration in which the inter-cylinder variable ΔTc is an input variable to the mapping.

[6] The random misfire determination process corresponds to the processes of S24 to S38 in FIG. 3. The continuous misfire determination process corresponds to the processes of S24a to S38a in FIG. 5.

[7] The decreasing process corresponds to the process of calculating the torsion elimination instantaneous speed ωeg from the raw speed ωeg0 shown in FIG. 2.

[8] The first execution device corresponds to the CPU 62 and the ROM 64. The second execution device corresponds to the CPU 92 and the ROM 94. The acquiring process corresponds to the processes of S50 and S22. The vehicle-side transmitting process corresponds to the process of S52. The vehicle-side receiving process corresponds to the process of S54. The handling process corresponds to the process of S40. The external-side receiving process corresponds to the process of S60. The output value calculation process corresponds to the processes of S62 to S66. The external-side transmitting process corresponds to the process of S68.

[9] The data analyzer corresponds to the center 90.

[10] The controller for the internal combustion engine corresponds to the controller 60 shown in FIG. 6.

[11] The computer corresponds to the CPU 62 and ROM 64 or the CPU 62, CPU 92, ROM 64, and ROM 94.

Other Embodiments

The present embodiment can be modified and implemented as below. The embodiments and the following modified examples may be implemented by being combined with each other within a scope not technically conflicting each other.

Decreasing Process

For example, as described below in "Vehicle," a vehicle may include only an internal combustion engine as a device generating thrust force. In such a case, for example, when the drive wheel 50 is mechanically connected to the crankshaft 24 by a transmission, the rotational speed of the input shaft of the transmission may be used as the input speed ωinp.

The decreasing process is not limited to that shown in FIG. 2. For example, the attenuation component calculation process M20 may be omitted.

It is not essential to calculate short rotation time T30 used to produce the input variable x based on the torsion elimination instantaneous speed ωeg.

Input to Mapping for Random Misfire (a) Inter-Cylinder Variable

The inter-cylinder variable ΔTb is not limited to the difference in short rotation time T30 corresponding to compression top dead center between two cylinders in which compression top dead centers are consecutively reached with separation of 720° CA. For example, the inter-cylinder variable ΔTb may be a difference in short rotation time T30 corresponding to compression top dead center between cylinders that are separated by 360° CA in terms of the reaching timing of compression top dead center with separation of 720° CA. This is "T30(12)−T30(24)−{T30(36)−T30(48)}."

In addition, for example, the difference in short rotation time T30 corresponding to compression top dead center between two cylinders with separation of 720° CA is not limited to a single difference corresponding to the compression top dead center of the cylinder subject to detection for misfire that is used as only an input to the mapping. For example, in addition to the inter-cylinder variable ΔTb(2), "T30(11)−T30(17)−{T30(35)−T30(41)}" may be included in the input to the mapping.

In addition, there is no limit to the difference in short rotation time T30 corresponding to compression top dead center between two cylinders with separation of 720° CA. For example, the difference in short rotation time T30 corresponding to compression top dead center between the cylinder subjected to detection for misfire and each of the remaining cylinders may be used as the input to the mapping.

For example, the inter-cylinder variable may be a ratio of short rotation time T30 corresponding to the compression top dead center of a cylinder to short rotation time T30 corresponding to the compression top dead center of another cylinder.

Short rotation time defining the inter-cylinder variable is not limited to the time taken to make a rotation of 30° CA. Short rotation time may be, for example, a time taken to make a rotation of 45° CA. In this case, short rotation time is a time taken to make a rotation of an angular interval shorter than a reaching interval of compression top dead center.

Furthermore, in the above description, an instantaneous rotational speed obtained by dividing a predetermined angular interval by the time taken to make a rotation of the predetermined angular interval may be used instead of the short rotation time.

(b) Fluctuation Pattern Variable

The definition of the fluctuation pattern variable is not limited to that exemplified in the above embodiments. For example, the definition of the fluctuation pattern variable may be changed by changing the inter-cylinder variable ΔTb to that exemplified in "Inter-cylinder variable."

Furthermore, it is not essential to define the fluctuation pattern variable as a ratio of the inter-cylinder variable ΔTb corresponding to a reaching timing of compression top dead center to the inter-cylinder variable ΔTb corresponding to another reaching timing of compression top dead center. Instead of the ratio, a difference may be obtained. Even in this case, for example, by including the operating point variable of the internal combustion engine 10 in the input, the value of the misfire variable PR is calculated reflecting changes in the value of the fluctuation pattern variable corresponding to the operating point.

It is not essential to include the fluctuation pattern variable in the input to the mapping.

(c) Rotation Waveform Variable

In the process of S64, the rotation waveform variable is configured by short rotation times T30 corresponding to nine reaching timings of compression top dead center that differ from each other. However, there is no limitation to such a configuration. For example, the rotation waveform variable may be configured by nine short rotation times T30(1), T30(7), T30(13), ..., T30(49). Further, for example, the rotation waveform variable may be configured by these nine short rotation times and the nine rotation times exemplified in the process of S64, that is, eighteen short rotation times. Here, short rotation time is not limited to the time taken to make a rotation of an interval of 30° CA. Further, an instantaneous rotational speed obtained by dividing a predetermined angular interval by a time taken to make a rotation of the predetermined angular interval may be used instead of short rotation time.

Input To Mapping For Continuous Misfire (a) Inter-Cylinder Variable

For example, instead of the inter-cylinder variable ΔTa(2), "T30(11)–T30(17)" may be used as an inter-cylinder variable (hereinafter referred to as ΔTa' (2)) and may be input to the mapping. Furthermore, for example, both the inter-cylinder variables ΔTa(2) and ΔTa'(2) may be included in the input to the mapping.

For example, instead of the inter-cylinder variable ΔTc(2), "T30(11)–T30(23)" may be used as an inter-cylinder variable (hereinafter referred to as ΔTc'(2)) and may be input to the mapping. Furthermore, for example, both the inter-cylinder variables ΔTc(2) and ΔTc'(2) may be included in the input to the mapping.

It is not essential to include both at least one of the inter-cylinder variable ΔTa(2) or the inter-cylinder variable ΔTa'(2) and at least one of the inter-cylinder variable ΔTc(2) or the inter-cylinder variable ΔTc'(2) as the input to the mapping.

Moreover, for example, the inter-cylinder variable may be a ratio of short rotation time T30 corresponding to the compression top dead center of a cylinder to short rotation time T30 corresponding to the compression top dead center of another cylinder.

Short rotation time defining the inter-cylinder variables ΔTa and ΔTc is not limited to the time taken to make a rotation of 30° CA and may be, for example, a time taken to make a rotation of 45° CA. In this case, short rotation time is a time taken to make a rotation of an angular interval shorter than a reaching interval of compression top dead center.

Furthermore, in the above description, an instantaneous rotational speed obtained by dividing a predetermined angular interval by the time taken to make a rotation of the predetermined angular interval may be used instead of short rotation time.

(b) Regarding Fluctuation Pattern Variable

The definition of the fluctuation pattern variable is not limited to that exemplified in the above embodiments. For example, the definition of the fluctuation pattern variable may be changed by changing the inter-cylinder variable ΔTc to that exemplified in "Inter-cylinder variable."

Furthermore, for example, the fluctuation pattern variable may be defined as a ratio of the inter-cylinder variable ΔTc corresponding to a reaching timing of compression top dead center to the inter-cylinder variable ΔTc corresponding to another reaching timing of compression top dead center.

It is not essential to define the fluctuation pattern variable as the ratio of the inter-cylinder variable ΔTc corresponding to a reaching timing of compression top dead center to the inter-cylinder variable ΔTc corresponding to another reaching timing of compression top dead center. Instead of the ratio, a difference may be obtained. Even in this case, for example, by including the operating point variable of the internal combustion engine 10 in the input, the value of the misfire variable PC may be calculated reflecting changes in the value of the fluctuation pattern variable corresponding to the operating point.

It is not essential to include the fluctuation pattern variable in the input to the mapping.

(c) Rotation Waveform Variable

In the process of S66, the rotation waveform variable is configured by short rotation times T30 corresponding to the nine reaching timings of compression top dead center that differ from each other. However, there is no limitation to such a configuration. For example, all of short rotation times T30 used to calculate the inter-cylinder variables ΔTb(2) and ΔTc(2) and the fluctuation pattern variables FC[02], FC[12], and FC[32] may be used. More specifically, six short rotation times T30(0), T30(6), T30(12), T30(12), T30(18), T30 (24), and T30(30) may be used. For example, the rotation waveform variable may be configured by six short rotation times T30(1), T30(7), T30(13), . . . , T30(33). Further, the rotation waveform variable may be configured by, for example, these six short rotation times and all of short rotation times T30 used to calculate the inter-cylinder variables ΔTb(2) and ΔTc(2) and the fluctuation pattern variables FC[02], FC[12], FC[32], that is, twelve short rotation times. Here, short rotation time is not limited to the time taken to make a rotation of an interval of 30° CA. An instantaneous rotational speed obtained by dividing a predetermined angular interval by a time taken to make a rotation of the predetermined angular interval may be used instead of short rotation time.

Misfire Detection

In the above embodiments, a random misfire and a continuous misfire are configured to be detected. However, it is not essential to distinguish a random misfire from a continuous misfire. A mapping that outputs misfire variables that do not distinguish them may be configured to use, for example, the inter-cylinder variable exemplified in "Input to Mapping for Random Misfire" and "Input to mapping for continuous misfire" described above as input variables.

Operating Point Variable

The operating point variable is not limited to the rotational speed NE and the filling efficiency 11. For example, the intake air amount Ga and the rotational speed NE may be used. Furthermore, for example, as described in "Internal Combustion Engine," when a compression ignition type internal combustion engine is used, the injection amount and the rotational speed NE may be the operating point variables. It is not essential to use the operating point variable as an input of the mapping. For example, when an internal combustion engine is mounted on a series hybrid vehicle described below in "Vehicle," the values of the misfire variables PR, PC may be calculated with high accuracy without including the operating point variable in the input variable in a case in which the internal combustion engine is driven only in a specific operating point.

Determination Process

Although the relationship between the threshold value Cth of the random misfire counter CR and the threshold value Cth of the continuous misfire counter CC is not particularly described in the embodiments, they may have different values. For example, the threshold value of the continuous misfire counter CC may be greater than the threshold value of the random misfire counter CR.

External-Side Transmitting Process

In the process of S68, the values of the misfire variables PR and PC are transmitted. However, there is no limitation to such a configuration. For example, the values of original variables yR(1), yR(2), yC(1), and yC(2) may be transmitted. Furthermore, for example, when the processes of S56 to S62, S32, S32a, S34, S36b, S38b are executed in the center 90, the result of determination of whether there is an abnormality may be transmitted.

Handling Process

In the above embodiments, the warning light 78 is operated to provide a notification that a misfire has occurred through visual information. However, there is no limitation to such a configuration. For example, a speaker may be operated to provide a notification that a misfire has occurred through auditory information. For example, the controller 60 shown in FIG. 1 may include the communication device 69, and the communication device 69 may be operated to transmit a signal indicating that a misfire has occurred to a portable terminal of the user. This may be implemented by installing an application program that executes the notification process in the portable terminal of the user.

The handling process is not limited to the notification process. The handling process may be, for example, an operation process that operates an operation unit for controlling combustion of the air-fuel mixture in the combustion chamber 18 of the internal combustion engine 10 in accordance with information indicating that a misfire has occurred. More specifically, for example, the operation unit may be the ignition device 22 and advance the ignition timing of the cylinder in which misfire has occurred. For example, the operation unit may be the fuel injection valve 20 and increase the amount of fuel injected into the cylinder in which a misfire has occurred.

Input to Mapping

The input to the neural network and the input to the regression equation described below in "Machine Learning Algorithm" are not limited to those in which each dimension is formed by a single physical quantity and fluctuation pattern variables FL and FC. In the above embodiments, different types of physical quantities and the fluctuation pattern variables FL, FC used as the input to the mapping are directly input to the neural network or the regression equation. Instead, for example, one or more of the different types of physical quantities and the fluctuation pattern variables FL, FC may be analyzed for main components, and some of the main components may be directly input to the neural network or the regression equation. However, when main components are input to the neural network or the regression equation, the main components do not necessarily have to be only a portion of the input to the neural network or the regression equation. The entirety of the input may be the main components. When main components are input to the mapping, the random misfire data 66a and 96a and the continuous misfire data 66b and 96b include data specifying a mapping that determines the main components.

Mapping Data

The mapping data specifying the mapping used in the calculation executed in the vehicle may be random misfire data 96a or continuous misfire data 96b that specifies the mapping exemplified in the processes of S64 and S66.

For example, according to the description of (a) and (b) in FIG. 7, the number of intermediate layers in the neural network is expressed as being more than two layers. However, there is no limitation to such a configuration.

In the above embodiments, the activation functions h, h1, h2, hα are ReLU, and the output activation function is a softmax function. However, there is no limitation to such a configuration. For example, the activation functions h, h1, h2, hα may be hyperbolic tangents. For example, the activation functions h, h1, h2, hα may be logistic sigmoid functions.

For example, the output activation function may be a logistic sigmoid function. In this case, for example, the number of nodes in the output layer may be one and used as a misfire variable.

Machine Learning Algorithm

The algorithm of machine learning is not limited to using a neural network. For example, a regression equation may be used. This corresponds to a neural network that does not include an intermediate layer. For example, a support vector machine may be used. In this case, the magnitude of the value of an output has no meaning. Whether the value is positive or not expresses whether a misfire has occurred. In other words, this differs from a configuration in which a misfire variable has three or more values and the magnitude of the values represents the magnitude of the probability of misfire.

Data Analyzer

For example, instead of the processes of S62 and S64, the processes of S24 to S28 and the processes of S24a to S28a may be executed by the center 90.

For example, the process in (b) in FIG. 7 may be executed by a portable terminal carried by the user. At this time, the transmitting process and the receiving process of the vehicle ID may be omitted, for example, by setting the distance at which data transmission in the process of S68 is effective to approximately the length of the vehicle.

Execution Device

The execution device is not limited to a device including the CPU 62 (92) and the ROM 64 (94) and executing the software processes. The execution device may include, for example, a dedicated hardware circuit (e.g., ASIC, etc.) configured to process at least some of the software processes executed in the embodiments described. In other words, the execution device may have any of the following configurations (a) to (c). Configuration (a) includes a processing device that executes all of the above processes in accordance with programs, and a program storage device such as a ROM that stores the programs. Configuration (b) includes a processing device and a program storage device that execute some of the above processes in accordance with programs, and a dedicated hardware circuit that executes the remaining processes. Configuration (c) includes a dedicated hardware circuit that executes all of the above processes. Here, the software execution device including the processing device and the program storage device or the dedicated hardware circuit may be provided in plurals. That is, the above processes may be executed by processing circuitry that includes at least one of one or more software execution devices or one or more dedicated hardware circuits. The program storage device, that is, a computer readable medium, includes various available media that can be accessed from a general purpose or a dedicated computer.

Storage Device

In the above embodiments, a storage device that stores random misfire data 66a, 96a and continuous misfire data 66b, 96b is separate from a storage device (ROM 64, 94) that stores the misfire program 64a and the misfire main program 94a. However, there is no limitation to such a configuration.

Computer

The computer is not limited to that configured by an execution device such as CPU 62 and ROM 64 mounted on the vehicle and an execution device such as CPU 92 and ROM 94 provided in the center 90. For example, the computer may be configured by an execution device mounted on the vehicle, an execution device provided in the center 90, and an execution device such as CPU and ROM in a portable terminal of the user. This can be implemented, for example, when the process of S68 in FIG. 7 is a transmission process to the portable terminal of the user, and the portable terminal executes the processes of S54 to S62, S32, S32a, S34, S36b, S38b, and S40. More specifically, an onboard execution device configured by the CPU 62 and the ROM 64 may be configured not to execute the vehicle-side receiving process and the handling process. A reception execution device included in the portable terminal may be configured to execute at least the vehicle-side receiving process.

Internal Combustion Engine

In the embodiments described above, the in-cylinder injection valve that injects fuel into the combustion chamber 18 is illustrated as the fuel injection valve. Instead, the fuel injection valve may be, for example, a port injection valve that injects fuel into the intake passage 12. For example, both a port injection valve and a cylinder injection valve may be provided.

The internal combustion engine is not limited to a spark ignition type internal combustion engine and may be, for example, a compression ignition type internal combustion engine that uses, for example, diesel as fuel.

Vehicle

The vehicle is not limited to a series-parallel hybrid vehicle. For example, the vehicle may be a parallel hybrid vehicle or a series hybrid vehicle. The vehicle is not limited to a hybrid vehicle and may be a vehicle including only an internal combustion engine as a device generating thrust force.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A misfire detection device of an internal combustion engine, the misfire detection device comprising:
a storage device; and
processing circuitry, wherein
the storage device stores mapping data, the mapping data being data specifying a mapping that outputs a misfire variable using a rotation waveform variable as an input, and the misfire variable indicating a probability that a misfire has occurred in the internal combustion engine,
the processing circuitry is configured to execute;
an acquiring process that acquires the rotation waveform variable based on a detection value of a sensor configured to detect a rotational behavior of a crankshaft of the internal combustion engine,
a determination process that determines whether the misfire is present based on an output of the mapping that uses the variable acquired by the acquiring process as an input, and
a handling process that operates predetermined hardware, when the determination process determines that a misfire has occurred, to occurrence of the misfire,
a domain of a rotational angle of the crankshaft is divided into multiple continuous rotational angle intervals,
the rotation waveform variable is a variable based on an instantaneous speed variable corresponding to each of discontinuous rotational angle intervals selected from the multiple continuous rotational angle intervals,
a cylinder that is subject to detection for misfire is a target cylinder,
the rotation waveform variable indicating a difference between a value of the instantaneous speed variable corresponding to a compression top dead center of the target cylinder and a value of the instantaneous speed variable corresponding to a compression top dead center of a cylinder differing from the target cylinder,
an interval between rotational angles at which the compression top dead centers are reached is a reaching interval,
the instantaneous speed variable indicating an instantaneous speed, the instantaneous speed being a rotational speed of the crankshaft in a rotational angle interval that is shorter than the reaching interval, and
the mapping data includes data learned by machine learning.

2. The misfire detection device according to claim 1, wherein
the input to the mapping includes an operating point variable, the operating point variable being a variable specifying an operating point of the internal combustion engine,
the acquiring process includes a process that acquires the operating point variable,
the determination process includes a process that determines whether the misfire is present based on an output of the mapping that further uses the operating point variable acquired by the acquiring process as the input to the mapping, and
the mapping outputs a value of the misfire variable through a join operation of the rotation waveform variable, the operating point variable, and a parameter learned by the machine learning.

3. The misfire detection device according to claim 1, wherein
the rotation waveform variable includes an inter-cylinder variable and a fluctuation pattern variable,
the inter-cylinder variable is a variable obtained by quantifying a difference between a value of the instantaneous speed variable corresponding to the compression top dead center of the target cylinder and a value of the instantaneous speed variable corresponding to the compression top dead center of the cylinder differing from the target cylinder,
the target cylinder and the cylinder differing from the target cylinder are a first set of cylinders, two cylinders differing from the first set of cylinders are a second set of cylinders, and the fluctuation pattern variable is a variable obtained by quantifying a relationship between the difference between the values of the instantaneous speed variable in the first set of cylinders and a difference between values of the instantaneous speed variable in the second set of cylinders, and
the mapping outputs a value of the misfire variable through a join operation of the inter-cylinder variable, the fluctuation pattern variable, and a parameter learned by the machine learning.

4. The misfire detection device according to claim 1, wherein the target cylinder and the cylinder differing from the target cylinder are two cylinders in which the compression top dead centers are consecutively reached.

5. The misfire detection device according to claim 1, wherein an interval between a rotational angle of the crankshaft at which the compression top dead center is reached in the target cylinder and a rotational angle of the crankshaft at which the compression top dead center is reached in the cylinder differing from the target cylinder is an interval of one rotation of the crankshaft.

6. The misfire detection device according to claim 1, wherein
the mapping data includes continuous misfire data that specifies a mapping for detecting a continuous misfire, in which a misfire continuously occurs in one cylinder, and random misfire data that specifies a mapping for detecting a random misfire, in which a misfire randomly occurs in multiple cylinders, and
the determination process includes
a continuous misfire determination process that determines whether the continuous misfire is present based on an output of the mapping specified by the continuous misfire data that uses the variable acquired by the acquiring process as the input, and
a random misfire determination process that determines whether the random misfire is present based on an output of the mapping specified by the random misfire data that uses the variable acquired by the acquiring process as the input.

7. The misfire detection device according to claim 1, wherein
the processing circuitry is configured to execute a decreasing process that decreases a phase deviation of a value of the instantaneous speed variable caused by torsion of the crankshaft and an input shaft mechanically connected to the crankshaft based on a difference between the value of the instantaneous speed variable of the crankshaft and speed of the input shaft, and
the rotation waveform variable acquired by the acquiring process is calculated based on an output of the decreasing process.

8. A misfire detection system for an internal combustion engine, the misfire detection system comprising:
the misfire detection device according to claim 1, wherein
the determination process further includes an output value calculation process that calculates an output value of the mapping that uses the variable acquired by the acquiring process as the input, and the processing circuitry includes:

a first execution device that is at least partially mounted on a vehicle and is configured to execute the acquiring process, a vehicle-side transmitting process that transmits data acquired by the acquiring process to outside the vehicle, a vehicle-side receiving process that receives a signal based on a calculation result of the output value calculation process, and the handling process; and a second execution device that is configured to execute an external-side receiving process that receives data transmitted by the vehicle-side transmitting process, the output value calculation process, and an external-side transmitting process that transmits a signal based on the calculation result of the output value calculation process to the vehicle.

9. The misfire detection system according to claim 8, wherein the first execution device includes an onboard execution device mounted on the vehicle and a reception execution device differing from the onboard execution device, the onboard execution device is configured to execute the acquiring process and the vehicle-side transmitting process that transmits data acquired by the acquiring process to outside the vehicle, and the reception execution device is included in a portable terminal and configured to execute at least the vehicle-side receiving process.

* * * * *